(12) United States Patent
Effenberger (10) Patent No.: US 8,913,888 B2
(45) Date of Patent: Dec. 16, 2014

(54) IN-BAND OPTICAL FREQUENCY DIVISION REFLECTOMETRY

(75) Inventor: Frank J. Effenberger, Colts Neck, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 144 days.

(21) Appl. No.: 13/270,669

(22) Filed: Oct. 11, 2011

(65) Prior Publication Data

US 2012/0027402 A1     Feb. 2, 2012

Related U.S. Application Data

(63) Continuation of application No. 12/020,010, filed on Jan. 25, 2008, now Pat. No. 8,050,556.

(60) Provisional application No. 60/890,943, filed on Feb. 21, 2007.

(51) Int. Cl.
    *H04B 10/071*    (2013.01)
(52) U.S. Cl.
    CPC .................................. *H04B 10/071* (2013.01)
    USPC .......................................................... 398/21
(58) Field of Classification Search
    CPC .................................................... H04B 10/071
    USPC ............................................................ 398/21
    See application file for complete search history.

(56) References Cited

U.S. PATENT DOCUMENTS

| | | | |
|---|---|---|---|
| 4,502,143 A * | 2/1985 | Kato et al. ..................... | 714/812 |
| 5,621,472 A * | 4/1997 | Kannapell et al. ............. | 348/505 |
| 6,771,904 B1* | 8/2004 | Sasaki et al. ..................... | 398/25 |
| 7,031,343 B1* | 4/2006 | Kuo et al. ....................... | 370/473 |
| 7,280,188 B2 | 10/2007 | Schmuck et al. | |
| 7,428,382 B2 | 9/2008 | Soto et al. | |
| 7,787,771 B2 | 8/2010 | Kim et al. | |
| 2004/0070750 A1* | 4/2004 | Iannelli et al. ................ | 356/73.1 |
| 2004/0208523 A1 | 10/2004 | Carrick et al. | |
| 2004/0233081 A1* | 11/2004 | Cesura et al. .................. | 341/118 |

(Continued)

FOREIGN PATENT DOCUMENTS

| | | |
|---|---|---|
| CN | 1333454 | 1/2002 |
| CN | 1681227 | 10/2005 |
| CN | 1743825 | 3/2006 |

OTHER PUBLICATIONS

"Digital Communications", 2nd edition, by Bernard Sklar, Prentice Hall PTR, 2001, pp. 835-848.*

(Continued)

*Primary Examiner* — Shi K Li
(74) *Attorney, Agent, or Firm* — Conley Rose, P.C.; Grant Rodolph; Brandt D. Howell (57) ABSTRACT

An apparatus comprising an optical transmitter coupled to an optical fiber, and an optical receiver coupled to the optical fiber, wherein the transmitter is configured to transmit a test signal data pattern and user data into the optical fiber, and wherein the receiver is configured to receive a reflection of the test signal data pattern. Also disclosed is a network component comprising a processor configured to implement a method comprising promoting the transmission of an optical test signal data pattern into an optical fiber, wherein the test signal data pattern creates a radio frequency (RF) tone, and detecting a reflection of the RF tone in the optical fiber.

21 Claims, 7 Drawing Sheets

(56) References Cited

U.S. PATENT DOCUMENTS

2005/0123293 A1   6/2005   Maki et al.
2006/0140639 A1   6/2006   Effenberger
2007/0116467 A1*  5/2007   Kwon et al. ............... 398/72
2007/0264017 A1* 11/2007   Mizutani et al. ........... 398/72

OTHER PUBLICATIONS

Pfeiffer, Thomas, "Supervision of the Fiber Layer in PON", OAN Study Group G.SUP; FSAN Meeting, Lannion, May 10, 2007, 18 pages.

International Telecommunication Union, "Series G: Transmission Systems and Media, Digital Systems and Networks, Digital Sections and Line System—Optical Line Systems for Local and Access Networks", Telecommunication Standardization Sector of ITU,G.984.3, Feb. 2004, 116 pages.

International Telecommunication Union, "Series G: Transmission Systems and Media, Digital Systems and Networks, Digital Sections and Line System—Optical Line Systems for Local and Access Networks", Telecommunication Standardization Sector of ITU,G.984.3, Amendment 1, Jul. 2005, 46 pages.

International Telecommunication Union, "Series G: Transmission Systems and Media, Digital Systems and Networks, Digital Sections and Line System—Optical Line Systems for Local and Access Networks", Telecommunication Standardization Sector of ITU,G.984.3, Amendment 2, Mar. 2006, 14 pages.

International Telecommunication Union, "Series G: Transmission Systems and Media, Digital Systems and Networks, Digital Sections and Line System—Optical Line Systems for Local and Access Networks", Telecommunication Standardization Sector of ITU,G.984.3, Amendment 3, Dec. 2006, 12 pages.

Colella, Barry et al., "Raman Crosstalk Control in Passive Optical Networks", Optical Society of America, 2006, 3 pages.

Chen, B., et al., "A Novel Technique for Low-Cost Embedded Non-intrusive Fiber Monitoring of P2MP Optical Access Networks", Optical Society of America, 2007, 3 pages.

Schmuck, H., et al., "Embedded OTDR techniques for Cost-Efficient Fibre Monitoring in Optical Access Networks", Alcatel Research and Innovation, 2006, 2 pages.

Yoshida, M., et al., "Long Distance Measurement with High Spatial Resolution by Optical Frequency Domain Reflectometry Using a Frequency Shifted Feedback Fiber Laser," CLEO, 2000.

Foreign communication from a related counterpart application—International Search Report and Written Opinion, PCT/CN2008/070329, May 29, 2008, 6 pages.

* cited by examiner

IN-BAND OPTICAL FREQUENCY DIVISION REFLECTOMETRY

CROSS-REFERENCE TO RELATED APPLICATIONS

The present application is a continuation of U.S. patent application Ser. No. 12/020,010 filed Jan. 25, 2008 by Frank J. Effenberger and entitled "In-Band Optical Frequency Division Reflectometry," which claims priority to U.S. Provisional Patent Application Ser. No. 60/890,943 filed Feb. 21, 2007 by Frank J. Effenberger and entitled "In-Band Optical Frequency Division Reflectometry," both of which are incorporated herein by reference as if reproduced in their entireties.

STATEMENT REGARDING FEDERALLY SPONSORED RESEARCH OR DEVELOPMENT

Not applicable

REFERENCE TO A MICROFICHE APPENDIX

Not applicable.

BACKGROUND

A passive optical network (PON) is one system for providing network access over "the last mile." The PON is a point to multi-point network comprised of an optical line terminal (OLT) at the central office, an optical distribution network (ODN), and a plurality of optical network units (ONUs) at the customer premises. Data is transmitted in the PON over optical fibers that connect the different PON components. When the physical conditions of the optical fibers deteriorate, the transmission of data is affected. For instance, breaks or partial breaks in the optical fibers can lead to a reduction in data transmission bandwidth, extensive traffic congestion, or a complete stop of data transmission.

Optical time domain reflectometry (OTDR) is one diagnostic tool that may be used to detect physical problems in fiber optics. In OTDR, a test signal comprising a light pulse is transmitted down the fiber, reflected at some point, and then measured using an OTDR receiver located at the same location from which the pulse originated. The delay time between transmission and reception of the pulse is used to calculate the round-trip distance of the pulse. The calculated round-trip distance is used to find the location of any deteriorations or breaks in the fiber, which may then be fixed or replaced.

One problem associated with OTDR is the separation of the test signal from the data signal. The test signal can be separated from the data signal using wavelength division multiplexing (WDM), which requires additional optical components in the PON. The test signal can also be separated from the data signal using frequency division multiplexing (FDM), in which case the technique is re-named optical frequency domain reflectometry (OFDR). Unfortunately, classical approaches to this require specialized transmitters and lead to reduced signal to noise ratios due to the reduced test signal power (e.g., 10% of the total transmitter power). A third technique is to use the user data signal as the test signal, such that the OFDR measurements are time-correlated with the data signal to recover the reflection delay times. However, such an approach may require significant amount of memory to process the two signals and may not be suitable for real-time implementation.

SUMMARY

In one embodiment, the disclosure includes an apparatus comprising an optical transmitter coupled to an optical fiber, and an optical receiver coupled to the optical fiber, wherein the transmitter is configured to transmit a test signal data pattern and a user data into the optical fiber, and wherein the receiver is configured to receive a reflection of the test signal data pattern.

In another embodiment, the disclosure includes a network component comprising a processor configured to implement a method comprising promoting the transmission of an optical test signal data pattern into an optical fiber, wherein the test signal data pattern creates a radio frequency (RF) tone, and detecting a reflection of the RF tone in the optical fiber.

In yet another embodiment, the disclosure includes a method comprising promoting the transmission of an optical test signal data pattern into an optical fiber, wherein the test signal data pattern creates an RF tone, detecting a reflection of the RF tone in the optical fiber, and transmitting a user data, wherein the test signal data pattern is not transmitted concurrently with the user data.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is an in-band OFDR system and method that may be used to detect problems in a PON. The in-band OFDR method may comprise transmitting a test signal data pattern from an OLT or a similarly configured component down a fiber in the PON. The test signal data pattern may be transmitted using the same transmitter that is used for transmitting the user data and at substantially the total transmission power of the transmitter. The test signal data pattern may be controlled to align the optical band of a reflected test signal data pattern with the optical band of a receiver at the OLT. The test signal data pattern may also be controlled to increase the test signal's power. The test signal data pattern may conform to the standard physical layer requirements of the PON. The test signal data pattern may be transmitted in a time alternating manner with the user data without causing significant delays in transmission of the user data. The reflected test signal data pattern may then be used to identify problems in the fiber or other optical components in the PON.

Figure 1:
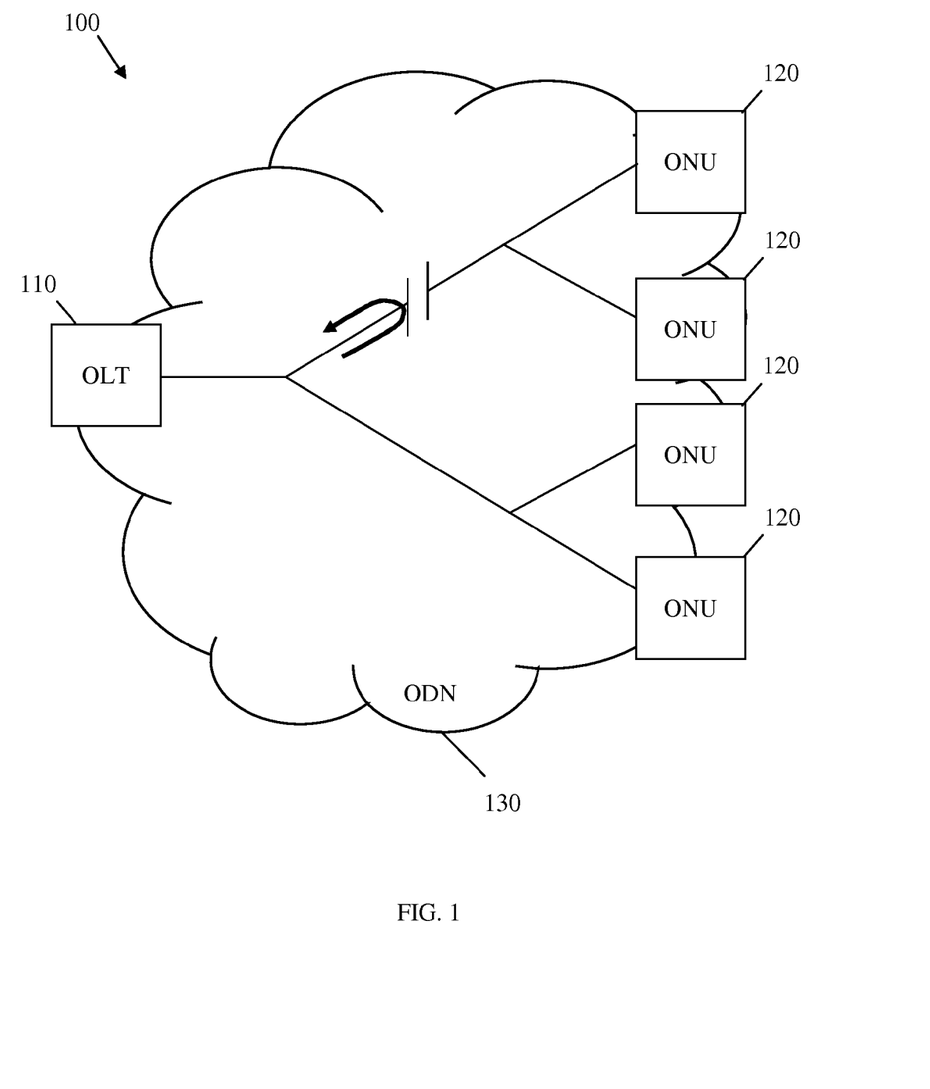
FIG. 1 is a schematic diagram of an embodiment of a PON system.

FIG. 1 illustrates one embodiment of a PON 100. The PON 100 comprises an OLT 110, a plurality of ONUs 120, and an ODN 130. The PON 100 is a communications network that does not require any active components to distribute data between the OLT 110 and the ONUs 120. Instead, the PON 100 uses the passive optical components in the ODN 130 to distribute data between the OLT 110 and the ONUs 120. Examples of suitable PONs 100 include the asynchronous transfer mode PON (APON) and the broadband PON (BPON) defined by the ITU-T G.983 standard, the Gigabit PON (GPON) defined by the ITU-T G.984 standard, the Ethernet PON (EPON) defined by the IEEE 802.3ah standard, and the wavelength division multiplexing PON (WDM-PON), all of which are incorporated by reference as if reproduced in their entirety.

One component of the PON 100 may be the OLT 110. The OLT 110 may be any device that is configured to communicate with the ONUs 120 and another network (not shown). Specifically, the OLT 110 may act as an intermediary between the other network and the ONUs 120. For instance, the OLT 110 may forward data received from the network to the ONUs 120, and forward data received from the ONUs 120 onto the other network. Although the specific configuration of the OLT 110 may vary depending on the type of PON 100, in an embodiment the OLT 110 may comprise a transmitter and a receiver, as explained in detail below. When the other network is using a protocol, such as Ethernet or SONET/SDH, that is different from the communications protocol used in the PON 100, the OLT 110 may comprise a converter that converts the other network's data into the PON's protocol. The converter may also convert the PON's data into the other network's protocol. The OLT 110 described herein is typically located at a central location, such as a central office, but may be located at other locations as well.

Another component of the PON 100 may be the ONUs 120. The ONUs 120 may be any device that is configured to communicate with the OLT 110 and a customer or user (not shown). Specifically, the ONUs 120 may act as an intermediary between the OLT 110 and the customer. For instance, the ONUs 120 may forward data received from the OLT 110 to the customer, and forward data received from the customer onto the OLT 110. Although the specific configuration of the ONUs 120 may vary depending on the type of PON 100, in an embodiment the ONUs 120 may comprise an optical transmitter configured to send optical signals to the OLT 110. Additionally, the ONUs 120 may comprise an optical receiver configured to receive optical signals from the OLT 110 and a converter that converts the optical signal into electrical signals for the customer, such as signals in the ATM or Ethernet protocol. The ONUs 120 may also comprise a second transmitter and/or receiver that may send and/or receive the electrical signals to a customer device. In some embodiments, ONUs 120 and optical network terminals (ONTs) are similar, and thus the terms are used interchangeably herein. The ONUs are typically located at distributed locations, such as the customer premises, but may be located at other locations as well.

Another component of the PON 100 may be the ODN 130. The ODN 130 is a data distribution system that may comprise optical fiber cables, couplers, splitters, distributors, and/or other equipment. In an embodiment, the optical fiber cables, couplers, splitters, distributors, and/or other equipment are passive optical components. Specifically, the optical fiber cables, couplers, splitters, distributors, and/or other equipment may be components that do not require any power to distribute data signals between the OLT 110 and the ONUs 120. The ODN 130 typically extends from the OLT 110 to the ONUs 120 in a branching configuration as shown in FIG. 1, but may be alternatively configured as determined by a person of ordinary skill in the art.

In an embodiment, the transmitter of the OLT 110 may be configured to transmit a test signal having a specific RF or a specific RF band, also referred to as an RF tone, down a fiber. The RF tone may reflect the optical frequency spectrum of the test signal. The transmitter may also be configured to encode the test signal data pattern using coding schemes known to a person of ordinary skill in the art. The test signal data pattern may be encoded to align the RF tone of the test signal with a particular RF tone. The particular RF tone may allow the receiver at the OLT 110 to detect efficiently an optical signal, e.g., in order for the receiver to measure substantially the total power of the optical signal. In one embodiment, the OLT 110 may comprise one receiver that receives the user data and the test signal. In another embodiment, the OLT 110 may comprise one receiver that receives the user data and an additional OFDR receiver that receives the test signal.

Figure 2:
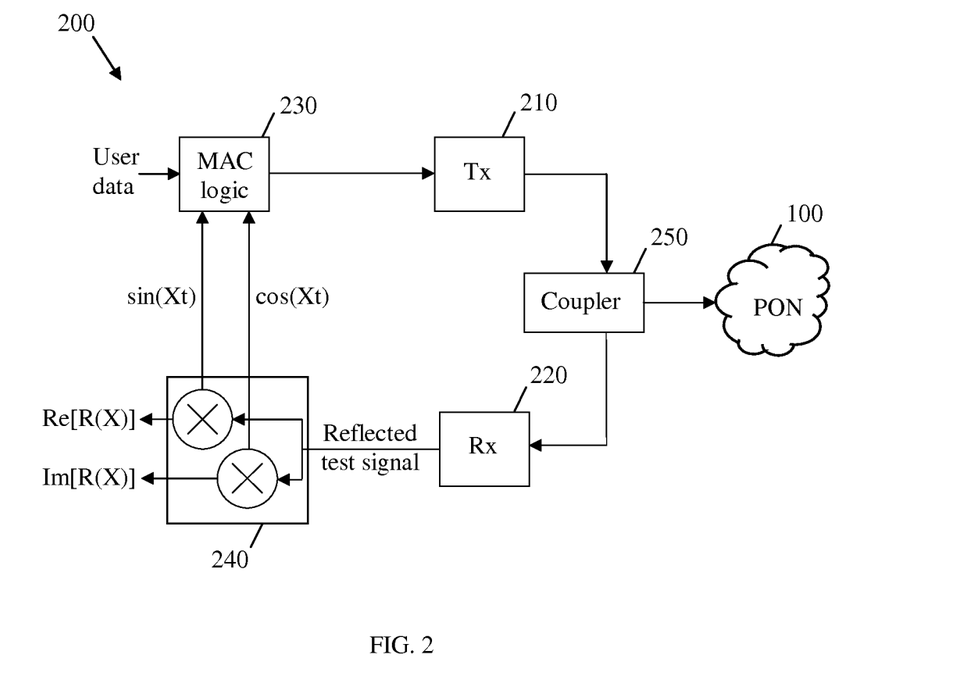
FIG. 2 is a schematic diagram of an embodiment of an in-band OFDR apparatus.

FIG. 2 illustrates an embodiment of an apparatus 200 that may be located at the OLT, any of the ONUs, or anywhere else in the PON 100. The apparatus 200 may be used to transmit and receive the user data and the test signal in the PON 100. The apparatus 200 may comprise a transmitter 210, a receiver 220, a media access control (MAC) device 230 coupled to the transmitter 210, an electronic detector circuit 240 coupled to the receiver 220 and the MAC device 230, and a coupler 250 coupled to both the transmitter 210 and the receiver 220. The MAC device 230 may receive the user data for downstream transmission, encapsulate the user data into the system standard format data frames, and send the encapsulated user data to the transmitter 210. The MAC device 230 may also generate and send an encapsulated test signal data frame to the transmitter 210. The transmitter 210 may transmit the test signal downstream via the coupler 250 into the PON 100. The receiver 220 may receive the reflected test signal via the coupler 250. The receiver 220 may send the reflected test signal to the electronic detector circuit 240 that may process the reflected test signal as described in detail below. In an embodiment, the electronic detector circuit 240 may be a heterodyne electronic detector circuit, which uses synthetic sinusoids generated by the MAC device 230 as its local oscillator signal. The output of the apparatus 200 provides the in-phase and quadrature RF components of the reflected signal.

A test signal may be initially transmitted and received under normal operating conditions, e.g., when there are no significant deteriorations or problems in the optical components of the PON. The measured power of the reflected test signal, or the test signal reflectivity, may then be used as a benchmark for standard operating conditions. When subsequent test signals are transmitted and received, the measured reflectivity of the test signals may be compared to the measured reflectivity of the initial test signal under normal operating conditions. For instance, a test signal may be initially transmitted over some optical components of the PON 100. The initial test signal may then be received and processed to establish a standard reflectivity measurement for the tested components under normal conditions. When the measured reflectivity of a subsequently transmitted test signal is found substantially equal or comparable to the measured standard reflectivity of the initial test signal, the tested components may still be assumed to operate under normal conditions. On the other hand, when the measured reflectivity of a subsequently transmitted test signal is found substantially different from the measured standard reflectivity of the initial test signal, the tested components may be assumed to operate under abnormal operating conditions. For example, the measured reflectivity of a test signal may be found considerably larger than the reflectivity of the initial test signal due to a break in the fiber that connects the PON components.

In some embodiments, a plurality of test signals with a plurality of different RF tones may be detected. The detected test signals of various RF tones may be processed in order to obtain information about the optical dispersion in the fiber, in addition to identifying other fiber problems. The transmitted test signal may undergo reflection at some location where a PON component, such as a coupler or a splitter, may be present. Processing the test signal reflected from that location may identify problems that may be related to the component.

The test signal data pattern of the test signal may be controlled using an idle-signal control as described in detail in U.S. patent application Ser. No. 11/023,741 filed Dec. 28, 2004 by Frank J. Effenberger and entitled "Methods and Apparatus for Raman Crosstalk Reduction via Idle data Pattern Control," and in IEEE Optical Fiber Communication Conference (OFC) presented February 2008 by Effenberger and Meng and entitled "In-band Optical Frequency Domain Reflectometry in PONs," which are incorporated by reference herein as if reproduced in their entirety. Using idle-signal control, a test signal with an idle data pattern may be controlled by shifting the RF tone of the test signal towards the OFDR RF tone. In an embodiment, the idle data pattern may be a scrambled data pattern comprising a random sequence of one-bits and zero-bits. The idle data pattern may be controlled and the RF tone corresponding to the idle data pattern may be shifted by re-coding the scrambled idle data pattern. The idle data pattern may be re-coded to resemble a particular code with specific spectral properties, which may be chosen such that the RF tone of the particular code is substantially aligned with the OFDR RF tone. In other words, the particular code may be chosen with specific spectral properties that may match or may be substantially aligned with the spectral properties required by the receiver for optimal detection.

The test signal data pattern may be used to create the desired sinusoidal excitation signals. Specifically, the test signal data pattern is designed such that most of its energy is concentrated in a particular electronic frequency. In one embodiment, a square-wave test signal data pattern may be generated, wherein the first N consecutive bits may be one and the next N consecutive bits may be zero, where N is an integer. The square-wave test signal data pattern may be repeated as needed to increase the reflected test signal strength. However, simple, long-period square wave patterns are not as preferable as other patterns because they do not concentrate all of their energy at one frequency and they may cause the transmission system to fail. Thus, a simple repeating digital pattern may be used such as 101010, which has its energy centered at one-half of the bit rate. In other embodiments, a more complex test signal data pattern may be utilized to provide a more pure RF tone than a square-wave test signal data pattern. The more complex test signal data pattern may be used to increase the reflectivity as well as the signal to noise ratio in the test signal. A test signal data pattern with a more pure RF tone may comprise a frequency spectrum with a sharper peak. The more complex test signal data pattern may comprise a particular code, which may be chosen such as the frequency spectrum of the code may have a sharp peak.

Adjusting the test signal data pattern to resemble a particular code having a sharp peak in the frequency spectrum may increase the power of the test signal and hence the accuracy of testing. Adjusting the test signal data pattern to achieve a sharp peak in the frequency spectrum of the test signal may also increase the optical cross-talk of the test signal. Specifically, adjusting the test signal data pattern to achieve a sharp peak in the frequency spectrum may increase the optical cross-talk at lower spectrum frequencies. Increasing the test signal power may also increase the testing speed of the OFDR system in addition to the signal strength, wherein the test signal speed may be proportional to the test signal strength. For example, using the in-band OFDR method and a test signal data pattern with a sharp spectral peak characteristic may increase the test signal strength from about ten percent (10%) to about one hundred percent (100%) of the transmitter power. Consequently, using the in-band OFDR method and a test signal data pattern with a sharp spectral peak characteristic may increase the test speed by about ten times.

Figure 3A:
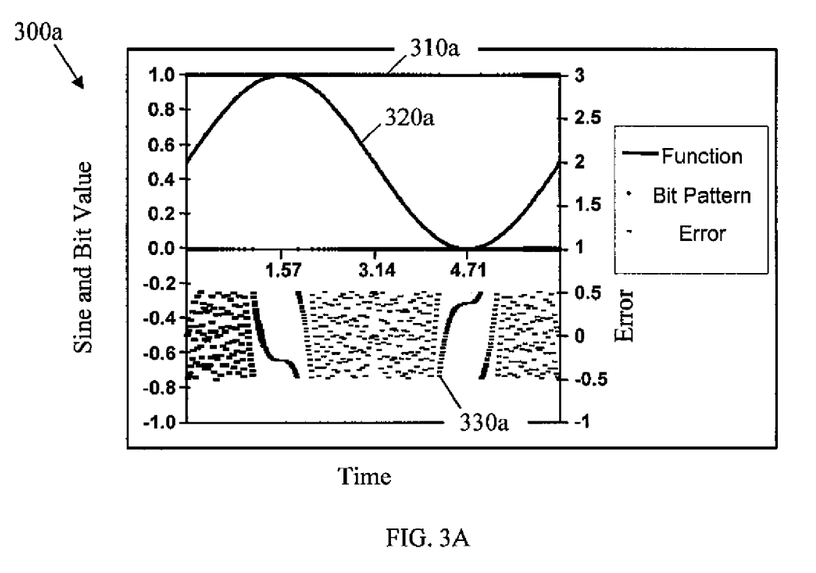
FIG. 3A is an illustration of an embodiment of a test signal.

FIG. 3A illustrates one embodiment of a test signal 300*a* that comprises a test signal data pattern 310*a* that may have a substantially pure RF tone. The test signal data pattern 310*a* may be generated using a coding scheme, such as a delta-sigma technique. The delta-sigma technique may be implemented using an electronic circuit converter or a processor that converts a pure RF tone sine wave function 320*a* into a test signal comprising a bit stream. Specifically, each transmitted bit may be based on a function augmented by the error from the previous bit. The error from the current bit is then passed on to the following bit. Thus, the test signal 300*a* may represent a function that is substantially equal to the pure RF tone sine wave function 320*a*. The test signal 300*a* may also comprise an RF tone that is substantially equal to the pure RF tone of the sine wave function 320 *a*. The delta-sigma technique may generate each consecutive bit in the test signal data pattern 310*a* of the test signal 300*a* to reduce the differences or the total error between the function corresponding to the test signal 300*a* and the pure RF tone sine wave function 320*a*. In FIG. 3A, each consecutive bit in the test signal data pattern 310*a* is generated to keep the total error 330*a* between the function corresponding to the test signal 300*a* and the pure RF tone sine wave function 320*a* bounded between about −0.5 and about 0.5.

The test signal may be generated using the MAC device 230 or the transmitter 210 so that the generated test signal may conform to the transmission protocols implemented in the PON. The test signal may also be generated to be compatible with the standard requirements of the optical transmission system as the user data signal. For example, if the physical layer of the transmission system does not tolerate more than 72 consecutive identical digits, the test signal data pattern may be modified with a periodic bit transition that meets the requirements of the transmission system. The periodic bit transmission may enable interruption of the transmission of the test signal data pattern during a transmission period and resume the transmission of the test signal data pattern at a subsequent period. By interrupting and resuming the transmission of the test signal data pattern over different transmission periods, the size of the test signal data pattern may be limited to the maximum size tolerated by the physical layer of the transmission system.

Figure 3B:
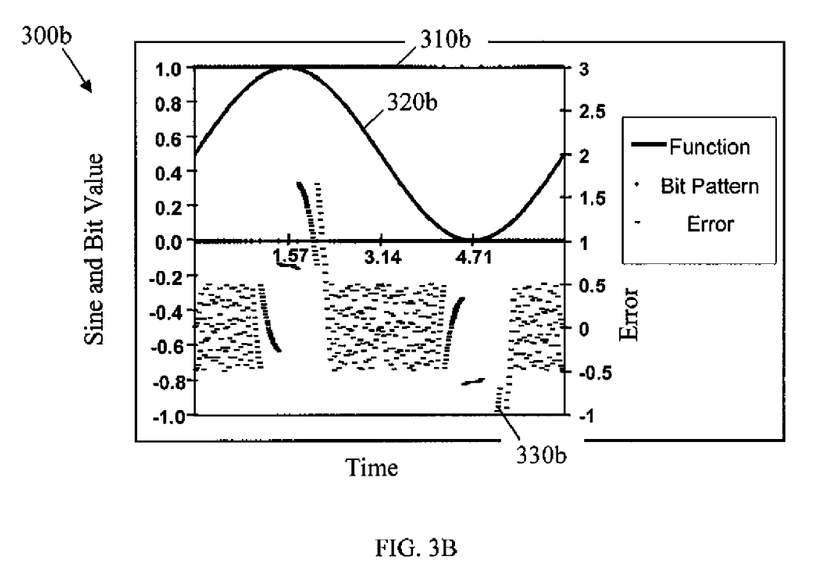
FIG. 3B is an illustration of another embodiment of a test signal.

FIG. 3B illustrates an embodiment of a test signal data pattern 300b that conform to the consecutive identical digit (CID) requirement of the transmission protocols in the PON. As in the case of FIG. 2A, each consecutive bit in the test signal data pattern 310b of the test signal 300b is generated using the delta-sigma technique to reduce the total error 330b between the function corresponding to the test signal and the pure RF tone sine wave function 320b. However, the test signal data pattern 310b may also comprise bit transitions implemented to meet the CID requirement, for example when the number of consecutive bits exceeds 72. The test signal data pattern 310b may comprise the bit transitions even when the bit transitions are not specified by the delta-sigma scheme to reduce the total error 330b. The forced bit transitions may introduce additional errors between the function corresponding to the test signal 300b and the pure RF tone sine wave function 320b. Consequently, the generated test signal data pattern 310b may comprise a less pure RF tone with a less sharp peak in the frequency spectrum. In FIG. 3A, the total error 330b between the function corresponding to the test signal 300b and the pure RF tone sine wave function 320b is found to exceed the range between about −0.5 and about 0.5 when the bit transitions occur.

In some embodiments, the transmission system may only transport data that are encapsulated into data frames. In such embodiments, the test signal data pattern may be encapsulated into the system standard format data frames, in a manner similar to the user data. For example, in the GPON, the test signal data pattern may be encapsulated into a GPON encapsulation method (GEM) frame that comprise a GEM header every 4096 bytes in the GEM frame. In addition, the transmission of the encapsulated test signal data pattern may be interrupted every 125 microsecond (μm) to transmit a transmission convergence-layer (TC-layer) physical control block (PCB) pattern. Both the GEM header and the TC-layer PCB pattern may increase the total error between the function corresponding to the test signal and the pure RF tone sine wave function. However, the expected increase in the total error may be less than or equal to about 0.1%. The test signal data pattern frames may be transmitted, and then reflected and received using the OFDR receiver. The received test signal data pattern frames may then be processed to extract the essentially reflected test signal data pattern. The essentially reflected test signal data pattern may then be obtained and processed for OFDR testing as described above.

The electronic detector circuit 240 may process the reflected test signal using oscillator signals generated by the MAC device 230 and Fourier transform techniques to measure the power of the reflected test signal versus the round-trip distance traveled by the test signal in the fiber. Specifically, the Fourier transform techniques may be utilized to compute the delay time of a plurality of test signals comprising a plurality of different RF tones. The plurality of test signals comprising the plurality of different RF tones may be transmitted over the same channel or band. The plurality of test signals comprising the plurality of different RF tones may then be received at the OLT 110 one at a time or separately. The plurality of RF tones may be slightly different from one another and may each match substantially the RF tone required for optimal detection by the OFDR receiver at the OLT 110.

In another embodiment, The OLT 110 may comprise a processor configured to process the reflected test signal and obtain the signal delay time. The signal delay time may represent the elapsed time from the instance of transmitting the test signal to the instance of receiving the test signal reception. Specifically, the delay time may be measured using an internal clock in the OLT 110. When the test signal delay time is obtained, the round-trip distance traveled by the test signal may be calculated. For instance, the test signal round-trip distance may be estimated by multiplying the delay time of the test signal by the speed of light inside the fiber. The test signal round-trip distance may provide information about the location where the test signal is being reflected inside the fiber. Specifically, dividing the round-trip distance by two yields the distance between the transmitter and the point of reflection, which may be the location of a problem in the fiber.

Figure 4:
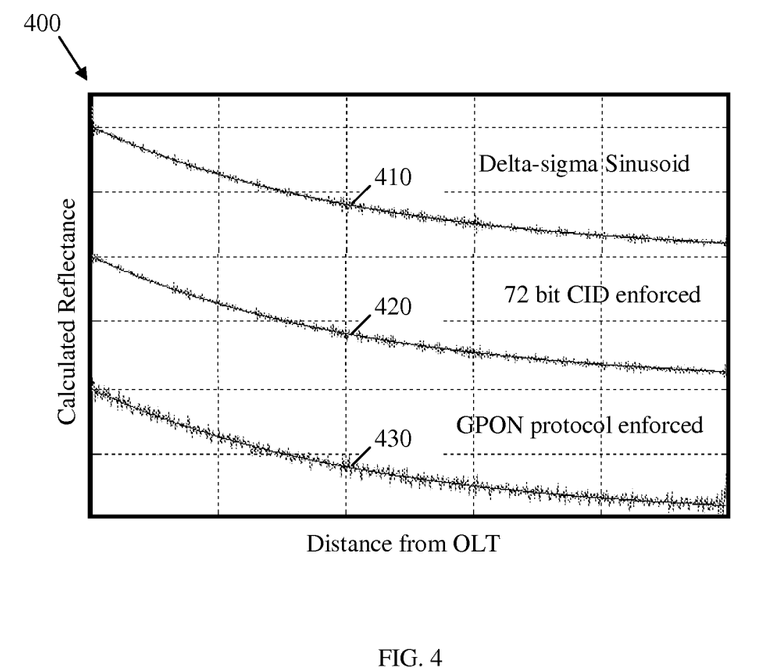
FIG. 4 is an illustration of another embodiment of a test signal.

FIG. 4 is a plot that shows the power or the signal strength of three reflected test signals 410, 420, and 430 versus the distance between the transmitter at the OLT 110 and the point of reflection. The powers are simulated for test signals that are transmitted and reflected in a fiber that is well behaved and exhibit only Rayleigh scattering. The three reflected test signals 410, 420, and 430 are numerically simulated for three test signals comprising three different test signal data patterns. The first reflected test signal 410 comprises the test signal data pattern 310a, shown in FIG. 3A, which is generated using the delta-sigma technique. The second reflected test signal comprises the test signal data pattern 310b, shown in FIG. 3B, which is generated using the delta-sigma technique and the bit transitions to meet the CID requirements of the of the transmission protocols in the PON. The third reflected test signal comprises a test signal data pattern encapsulated into a GEM frame and transmitted with the TC-layer PCB patterns in the GPON. In FIG. 4, the total error between the function corresponding to the test signal and the pure RF tone sine wave function in each of the reflected test signals 410, 420, and 430 is found to fluctuate along the range of distance from the OLT to the point of reflection.

The strength of fluctuation or the deviation in the total error for the third reflected test signal 430 is found to be larger than that in the second reflected test signal 420 and in the first reflected test signal 410 due to the additional imposed framing requirements of the GPON. Similarly, the deviation in the total error for the second reflected test signal 420 is found to be larger than that in the first reflected test signal 410 due to the additional imposed CID requirement. However, the increase in the total error deviation in both the second reflected test signal 420 and the third reflected test signal 430 is found close enough to that of the first reflected test signal 410 and may be similarly tolerated.

The test signal round-trip distance over a fiber may also be compared to the round-trip distance between the OLT 110 and any of the ONUs 120. When the test signal round-trip distance in the fiber is found shorter than the round-trip distance between the OLT 110 and any of the ONUs 120, a physical problem may be identified in the fiber. In addition, the power of the reflected test signal, as measured by the receiver at the OLT 110, may be compared to the power of the transmitted test signal to identify the nature of the problem in the fiber, the extent of the problem in the fiber, or both. For example, a substantial drop in the measured power of the reflected test signal relative to the power of the transmitted test signal may signify normal fiber conditions or partial fiber breaks. On the other hand, a negligible drop in the measured power of the reflected test signal relative to the power of the transmitted test signal may signify more serious problems or complete breaks in the fiber.

The OLT 110 may transmit the user data down the fiber to the ONUs 120 using the same transmitter used to generate the test signal data patterns. The user data signal and the test signal may be both transmitted at substantially the total transmission power of the transmitter. Hence, the transmitted user data signal and the test signal may be substantially equal in signal strength. When the signal strength of the test signal is substantially equal to that of the transmitted user data, the signal to noise ratio (SNR) of the test signal may be comparable to that of the user data signal. In addition, the reflected test signal may have a substantially increased SNR in comparison to other OFDR schemes. Increasing the SNR of the reflected test signal may increase the estimation accuracy of the test signal round-trip distance. Increasing the SNR of the reflected test signal may also improve the test signal reflectivity measurements using the receiver. With improved time delay estimates and reflection power measurements of the reflected test signal, physical problems in fibers may be identified with higher certainties and faster time.

In some other embodiments, the OLT 110 may transmit different test signals to different subsets of ONUs 120. Each subset may comprise a plurality of ONUs 120 grouped together, wherein each subset may be connected to the OLT 110 over some route in the ODN 130. For example, the PON 100 in FIG. 1 may branch into two primary subsets of ONUs 120, wherein each of the two primary subsets may include a group of two ONUs. Alternatively, each of the two primary subsets may be further branched into two secondary subsets leading to a total of four secondary subsets. Each of the four secondary subsets may include one separate ONU 120. The OLT 110 may thus assign to each of the two primary subsets, or alternatively to each of the four secondary subsets, a separate channel to implement the in-band OFDR scheme described herein. The OLT 110 may transmit and receive separate test signals over each channel to identify physical problems corresponding to each of the subsets of ONUs 120.

In other embodiments of the PON 100, the test signal may be transmitted, received, and processed at locations other than the OLT 110. For example, one or a plurality of ONUs 120 in the PON 100 may be configured to transmit a test signal data pattern as described above. The ONUs 120 may comprise a receiver that may receive the reflected test signal data pattern and measure the reflectivity of the test signal. The ONUs 120 may also comprise a special processor that may estimate the test signal delay time and round-trip distance.

The user data and the test signal data pattern may not be transmitted concurrently down the fiber. Instead, the user data and the test signal data pattern may be transmitted down the same fiber in a time alternating manner. For instance, different transmission time slots may be allocated for the user data and the test signal data pattern. Specifically, the user data and the test signal data pattern may be transmitted using time division multiplexing (TDM). Using TDM, user data and test signal data patterns may be divided into bit streams and transported in recurrent timeslots, which may then be resequenced at the destination. The OLT 110 may use the TDM scheme for transmitting the user data and the test signal data pattern over the same channel or band. The OLT 110 may also use the TDM scheme for receiving the user data at the ONUs 120 without conflict between the user data and the test signal data pattern. For instance, the TDM scheme may specify the first block size and the second block size in a periodic transmission window for transmitting the first portion of the user data and the second portion of the user data, respectively. The TDM scheme may similarly specify a block size in the transmission window for transmitting the test signal data pattern. The test signal data pattern may be assigned a block size that is large enough to transmit and receive the complete test signal before resuming the transmission of the user data.

In another embodiment, a plurality of block sizes may be assigned for transmitting different portions of the test signal data pattern, and for transmitting different portions of the user data in a periodic transmission window. The total size of user data blocks may be larger than the total size of test signal data pattern blocks to reduce delays in transporting user data and to maximize the utilization of transmission channel capacity. The maximum channel capacity may be maximized by allowing the largest possible total size of user data blocks in the periodic transmission window. The user data may be transmitted using the TDM scheme with higher bit rates than the test signal data pattern in order to eliminate or reduce any significant delays in delivering the user data. For example, the user data may be transmitted at about ninety-nine percent (99%) of a transmission bit rate. The remaining about one percent (1%) of the transmission bit rate may be dedicated to transmitting the test signal data pattern.

Figure 5:
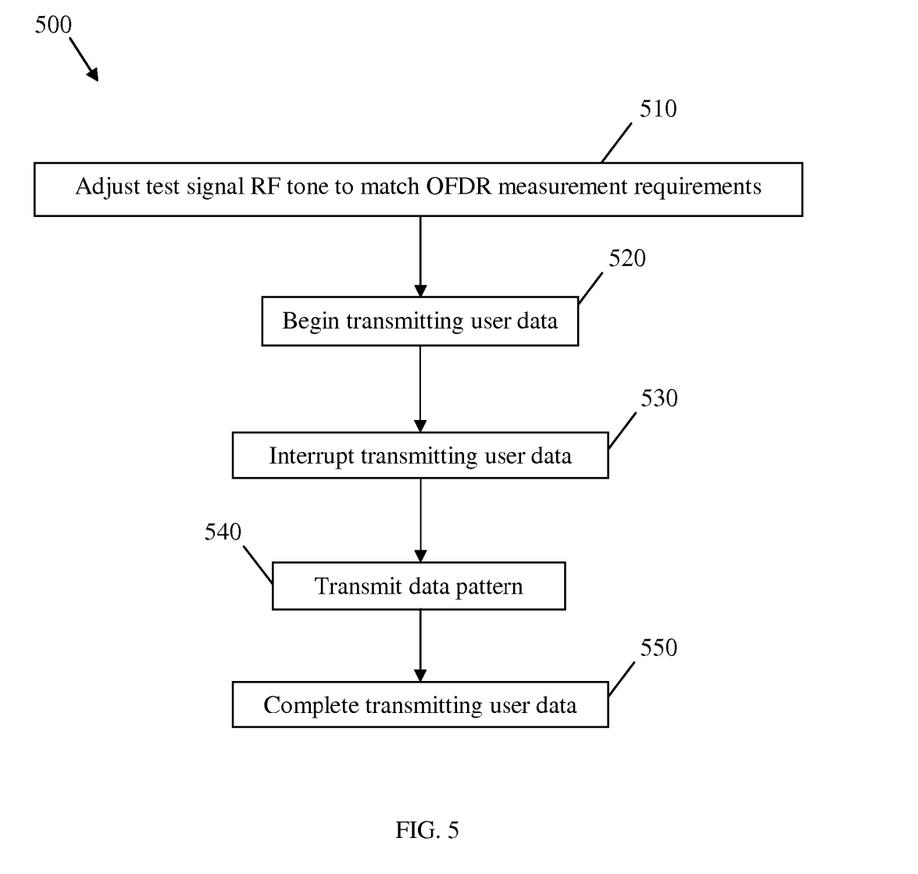
FIG. 5 is a flowchart of an embodiment of an in-band OFDR method.

FIG. 5 illustrates an embodiment of a method 500 for implementing an in-band OFDR method. At block 510, the method 500 may begin by adjusting the RF tone of the test signal to match the OFDR measurement requirements. The RF tone of the test signal may be adjusted by aligning the RF tone of the test signal with the OFDR RF tone for optimal detection sensitivity. The OFDR RF tone that produces optimal detection sensitivity may be specified by the design of the OFDR equipment. The RF tone of the test signal may be aligned with the OFDR RF tone that produces optimal detection by controlling the test signal data pattern of the test signal, wherein different test signal data patterns may have different RF tones.

At block 520, the method 500 may begin transmitting user data downstream, for example, from the OLT to at least one of the ONUs. At block 530, the user data transmission may be interrupted and the test signal data pattern transmission may begin. The user data may be transmitted with a relatively large fraction of the total bit rate of the transmission channel, while the test signal data pattern may be allocated a small fraction of the total bit rate of the channel. Transmitting the user data at a high fraction of the total channel bit rate than that of the test signal data pattern may prevent any considerable time delays in user data arrivals. At block 540, the test signal data pattern transmission may be interrupted and the user data transmission may be resumed. At block 550, the transmission of the user data may be completed until no more user data is transmitted during one transmission session. The transmission session may be repeated and the method 500 may be implemented for each transmission session. The transmission session may be repeated over a time period window to transmit both the user data and the test signal data pattern. Repeating the transmission of the test signal data pattern over each session may be needed to increase the test signal power and the SNR in the reflected test signal.

The method 500 may pause for a predetermined duration after interrupting the transmission of user data, at block 530, and before beginning the transmission of the test signal data pattern, at block 540. The method 500 may also pause for another predetermined duration after the end of the test signal data pattern transmission, at block 540, and before resuming the user data transmission at block 550. Pausing during transitioning from the user data transmission to the test signal data pattern transmission, as well as during transitioning from the test signal data pattern transmission to the user data transmission, may be necessary for transporting one complete portion of the user data to the ONUs. Pausing during the two transitioning intervals may also prevent conflict between the user data and the test signal data pattern. During the transmission of the test signal data pattern, the remaining portion of non-transmitted user data may be buffered at the OLT, for example, using some dedicated memory buffer. When the transmission of the test signal data pattern is completed, the transmission of the user data may be resumed by accessing the remaining user data in the memory buffer.

In another embodiment of the method 500, the test signal RF tone may be adjusted after interrupting the transmission of user data, at block 530, and before transmitting the test signal data pattern, at block 540. For instance, the test signal RF tone may be adjusted during a pause between ending user data transmission and starting test signal transmission. In yet another embodiment, the test signal RF tone may be adjusted initially one time before beginning the transmission. When the test signal RF tone is adjusted initially, the same test signal may be transmitted during every session or periodic transmission window. Adjusting the test signal RF tone at one time may allow for higher testing speed in the system with no or fewer pauses.

Figure 6:
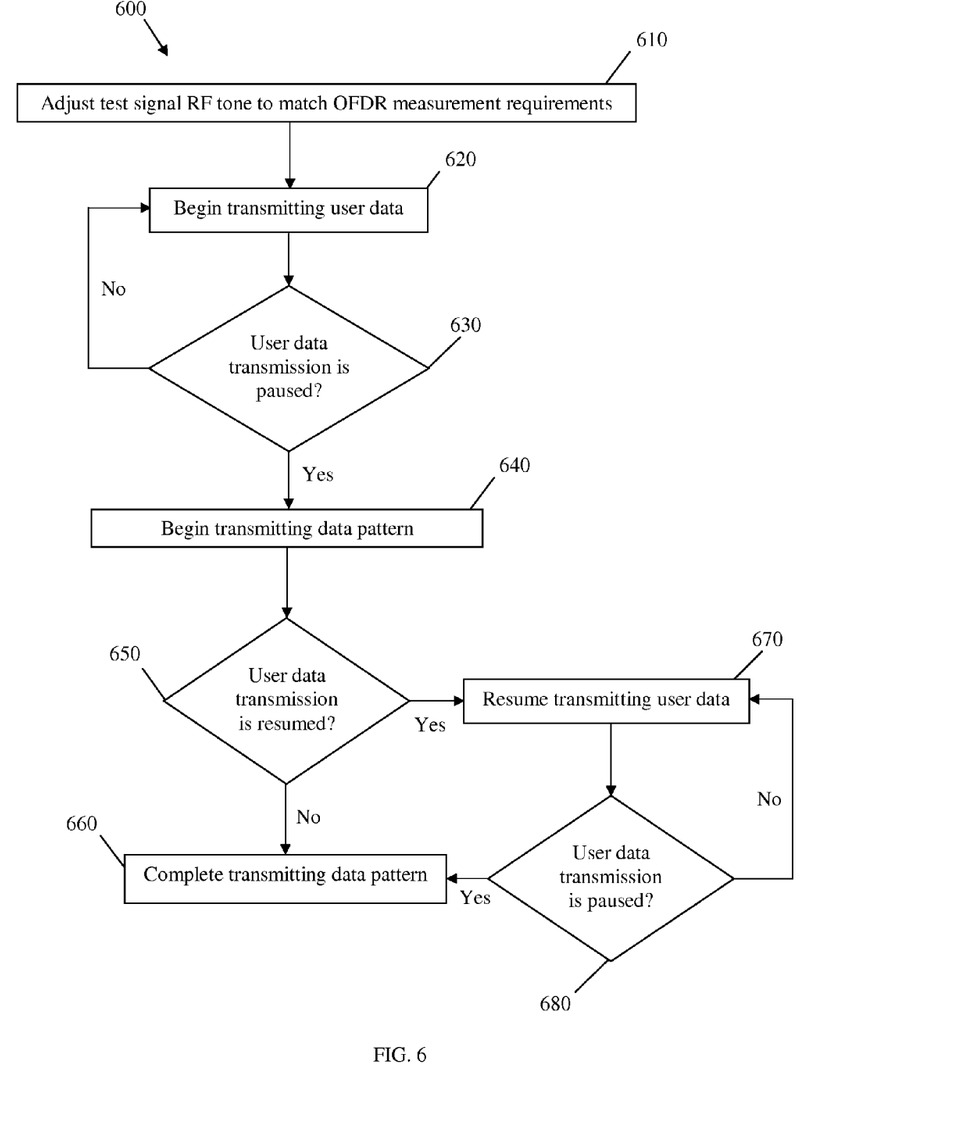
FIG. 6 is a flowchart of another embodiment of the in-band OFDR method.

FIG. 6 illustrates another embodiment of a method 600 for implementing the in-band OFDR method. The method 600 may initially transmit user data. The method 600 may assign transmission time for transmitting the test signal data pattern whenever no user data is available for transmission. At block 610, the method 600 may begin by adjusting the RF tone of the test signal to match the OFDR measurement requirements. The RF tone of the test signal may be adjusted by controlling the test signal data pattern of the test signal using a particular coding scheme with desired spectral properties, as described above.

At block 620, the method 600 may begin transmitting user data down the fiber using the transmitter. The method 600 may continue transmitting the user data until a pause is detected in the user data transmission, or until no more user data may be available for transmission. At block 630, a pause in the user data transmission may be detected when the user data flow is halted. In another embodiment, a break may also be signaled at the end of the user data stream, for instance in the form of a special bit or bit pattern, to signal a pause in the user data flow. The method 600 may proceed to block 640 after detecting a pause in the transmission of user data. At block 640, the method 600 may begin transmitting the test signal data pattern as described above. At block 650, the method 600 may detect another flow of user data that is available for transmission before the method 600 may complete the transmission of the test signal data pattern. In some embodiments, a signal in the form of a special bit or bit pattern may be received indicating the arrival of more user data available for transmission. On the other hand, when the method 600 does not detect any user data available for transmission, the method 600 may proceed to block 660. At block 660, the method 600 may continue transmitting the test signal data pattern until the entire test signal data pattern is transmitted. In the case when the method 600 detects a new flow of user data, the method 600 may proceed from transmitting the test signal data pattern at block 650 to block 670. At block 670, the method may interrupt the transmission of the test signal data pattern and resume the transmission of user data. At block 680, another pause in the user data transmission may be detected when the user data flow is yet again halted, or when a break signal is received to indicate a pause in user data transmission. Hence, the method 600 may proceed again to block 660 and continue transmitting the test signal data pattern until the entire test signal data pattern is transmitted.

In the method 600, the transmission of the test signal data pattern may be interrupted several times. The method 600 may alternate between transmitting user data and transmitting the test signal data pattern giving higher priority to transmitting user data over transmitting the test signal data pattern. The method 600 may thus begin transmitting the test signal data pattern only when user data is not available for transmission. The method 600 may interrupt the transmission of the test signal data pattern every time more user data is available for transmission. The method 600 may also resume transmitting the test signal data pattern only when user data is not available for transmission and until the entire test signal data pattern may be transmitted. Giving higher priority to transmitting user data over transmitting the test signal data pattern may reduce delays in transporting user data and maximize the utilization of channel capacity.

In the method 600, the test signal RF tone may be adjusted initially one time before beginning the transmission of user data and the test signal data pattern. Adjusting the test signal RF tone initially at one time may allow for higher testing speed in the system. In other embodiments of the method 600, the test signal RF tone may be adjusted every time before resuming the transmission of the test signal data pattern. Adjusting the test signal RF tone before resuming the transmission of the test signal data pattern may make the in-band OFDR method more adaptive to the PON system conditions.

Figure 7:
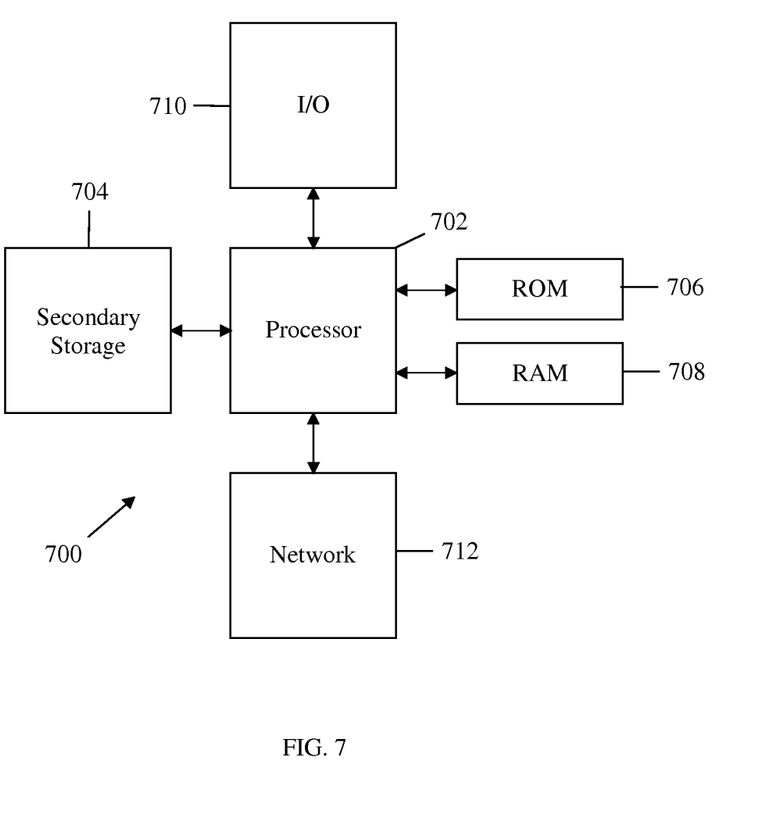
FIG. 7 is a schematic diagram of one embodiment of a general-purpose computer system.

The network described above may be implemented on any general-purpose network component, such as a computer or network component with sufficient processing power, memory resources, and network throughput capability to handle the necessary workload placed upon it. FIG. 7 illustrates a typical, general-purpose network component suitable for implementing one or more embodiments of a node disclosed herein. The network component 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor may be implemented as one or more CPU chips, or may be part of one or more application specific integrated circuits (ASICs).

The secondary storage 704 is typically comprised of one or more disk drives or tape drives and is used for non-volatile storage of data and as an over-flow data storage device if RAM 708 is not large enough to hold all working data. Secondary storage 704 may be used to store programs that are loaded into RAM 708 when such programs are selected for execution. The RAM 708 may also act as a buffer. The ROM 706 is used to store instructions and perhaps data that are read during program execution. ROM 706 is a non-volatile memory device that typically has a small memory capacity relative to the larger memory capacity of secondary storage. The RAM 708 is used to store volatile data and perhaps to store instructions. Access to both ROM 706 and RAM 708 is typically faster than to secondary storage 704.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
   receiving a user data frame comprising user data from an upstream node;
   intentionally creating line patterns with significant single frequency tones used to implement an optical frequency domain reflectometry (OFDR) system, wherein the line patterns with significant single frequency tones are used as a test signal data pattern;
   encapsulating the test signal data pattern in a test signal data frame that does not comprise the user data, and
   transmitting the test signal data frame and the user data frame into an optical fiber toward a downstream node using time division multiplexing (TDM),
   wherein a transmitter is used as a delta-sigma modulator and a digital waveform is generated for use as the test signal data pattern by modulating fractions of 0's and 1's sent in a certain period, and
   wherein a sinusoidal function is approximated by the sequence of 0's and 1's.

2. The method of claim 1, wherein an accumulated error is bounded.

3. The method of claim 1, further comprising transmitting the encapsulated 1 test signal data pattern in a same optical band as the user data.

4. The method of claim 3, wherein the transmitter is part of an optical line terminal.

5. The method of claim 1, wherein the user data is transmitted downstream sequentially and non-concurrently with the test signal data pattern, and wherein the test signal data frame comprises a header.

6. An optical frequency domain reflectometry (OFDR) system comprising:
   a Media Access Control (MAC) unit configured to:
      intentionally create line patterns with significant single frequency tones for use as a test signal pattern by employing a series of bits;
      insert a bit transition in the test signal pattern;
      encapsulate the test signal pattern in a test signal frame comprising a header;
      act as a delta-sigma modulator; and
      generate a digital waveform to act as the test signal pattern by modulating fractions of 0's and 1's for transmission in a certain period, wherein a sinusoidal function is approximated by the sequence of 0's and 1's; and
   a transmitter coupled to the MAC unit and configured to:
      transmit signals received from the MAC unit; and
      transmit the test signal frame and a data frame across an optical network using time division multiplexing (TDM).

7. The OFDR system of claim 6, wherein an accumulated error is bounded between −0.5 and 0.5.

8. The OFDR system of claim 7, wherein the data frame comprises user data received from the MAC unit.

9. The OFDR system of claim 6, wherein the transmitter is configured to transmit the test signal frame in a same optical band as user data.

10. The OFDR system of claim 9, wherein the OFDR system is part of an optical line terminal.

11. The OFDR system of claim 6, wherein the transmitter is further configured to transmit user data, and wherein the test signal pattern is transmitted sequentially and non-concurrently with the user data.

12. An apparatus comprising:
   a receiver configured to receive a user data frame comprising user data from an upstream node;
   an optical transmitter coupled to an optical fiber; and
   an optical receiver coupled to the optical fiber,
   wherein the optical transmitter is configured to:
      encapsulate a test signal data pattern in a test signal data frame that does not comprise the user data; and
      transmit the test signal data frame and the user data frame into the optical fiber using time division multiplexing (TDM),
   wherein the optical receiver is configured to receive a reflection of the test signal data pattern, and
   wherein the test signal data pattern is a digital signal comprising an approximation of a sinusoidal function.

13. The apparatus of claim 12, wherein the test signal data pattern contains a frequency spectrum substantially similar to an optical frequency domain reflectometry (OFDR) signal.

14. The apparatus of claim 12, wherein the optical transmitter transmits the test signal data pattern using substantially all of the transmitter power.

15. The apparatus of claim 12, wherein the optical transmitter transmits the test signal data pattern using a common optical band with the user data.

16. The apparatus of claim 15, wherein the optical transmitter transmits the test signal data pattern when there is no user data being received by the apparatus.

17. The apparatus of claim 15, further comprising a buffer coupled to the optical transmitter and configured to buffer the user data during transmission of the test signal data pattern, and wherein the optical transmitter transmits a first portion of the test signal data pattern, the user data, and then a second portion of the test signal data pattern.

18. The apparatus of claim 12, wherein the user data conforms to an optical physical layer transmission standard, and wherein the test signal data pattern also conforms to the optical physical layer transmission standard.

19. The apparatus of claim 12, wherein the user data conforms to a protocol layer transmission standard, and wherein the test signal data pattern conforms to the protocol layer transmission standard.

20. The apparatus of claim 12, wherein the apparatus is part of an optical line terminal (OLT), wherein the test signal data pattern is a digital signal that approximates a sine wave, and wherein the test signal data pattern is generated using a delta-sigma technique.

21. The apparatus of claim 12, wherein the test signal data frame and the user data frame are transmitted into the optical fiber sequentially and non-concurrently, and wherein the test signal data frame comprises a header.

* * * * *

UNITED STATES PATENT AND TRADEMARK OFFICE
CERTIFICATE OF CORRECTION

PATENT NO. : 8,913,888 B2  
APPLICATION NO. : 13/270669  
DATED : December 16, 2014  
INVENTOR(S) : Frank J. Effenberger

Page 1 of 1

It is certified that error appears in the above-identified patent and that said Letters Patent is hereby corrected as shown below:

In the Claims:

Column 13, Lines 28-30, Claim 3, should read as:
-- 3. The method of claim 1, further comprising transmitting the encapsulated test signal data pattern in a same optical band as the user data. --

Signed and Sealed this
Twenty-eighth Day of April, 2015

Michelle K. Lee
*Director of the United States Patent and Trademark Office*